Patented July 20, 1937

2,087,278

UNITED STATES PATENT OFFICE 2,087,278

PROCESS OF PURIFYING CHLORINE AND REACTION THEREFOR

Eugene D. Crittenden, Syracuse, N. Y., assignor to The Solvay Process Company, New York, N. Y., a corporation of New York No Drawing. Application March 28, 1936, Serial No. 71,450

11 Claims. (Cl. 23—219)

This invention is directed to the production and purification of chlorine and relates more particularly to the removal from commercial grades of chlorine of impurities present therein, thus rendering the product safer to handle and more suitable as an article of commerce.

Commercial chlorine is produced ordinarily either by the electrolytic method involving electrolysis of brine or by the action of nitric acid or nitrogen tetroxide on chlorides such as sodium, potassium or calcium chloride. Electrolytic chlorine is apt to contain chlorine oxides, principally the monoxide. It may at times contain also nitrogen trichloride. Chlorine produced by the interaction of nitric acid on chlorides may contain nitrosyl chloride. The presence of these impurities is undesirable due to their explosive and toxic effects. $Cl_2$ and also $ClO_2$, for example, are highly unstable compounds, having high positive free energies of formation and their presence in appreciable quantities in chlorine constitutes a serious explosion hazard. It is the object of this invention to provide a process permitting ready removal of such impurities with production of chlorine therefrom.

It has been found that chlorine oxides, e. g., $Cl_2O$, react directly and spontaneously with nitrosyl chloride to form an oxide of nitrogen and free chlorine. In the case of chlorine monoxide the reaction proceeds according to the following equation:

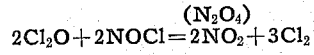
$$2Cl_2O + 2NOCl = 2NO_2 + 3Cl_2$$
$(N_2O_4)$

The above reaction is here utilized in the purification of chlorine. Such purification can be effected, for example, by adding nitrosyl chloride to chlorine produced electrolytically. It should be noted that the nitrosyl chloride may also react with any nitrogen trichloride present according to the following equation:

$$NCl_3 + NOCl = N_2O + 2Cl_2$$

Similarly chlorine monoxide may be added to chlorine produced by the reaction of nitric acid with salt. Alternatively chlorine produced by the one process may be added to chlorine produced by the other process, thus obtaining a product which is purer than either of the separate components.

The addition of the purifying agent to the chlorine or the mixing of the two different types of chlorine may be performed with the chlorine in either gaseous or liquid state, the interaction being spontaneous in both phases.

*Examples*

1. At room temperature, to gaseous chlorine containing a small proportion of chlorine monoxide was added about a stoichiometric equivalent of nitrosyl chloride. Within a few seconds the mixture darkened in color indicating the formation of nitrogen tetroxide. After standing over night, the mixture was liquefied by cooling and carefully fractionated. The fraction boiling above $+5°$ C. was analyzed and found to be chiefly nitrogen tetroxide.

2. At about $-78°$ C., to a mixture of 30 grams of liquid chlorine and about 2 grams of chlorine monoxide was added 1.5 grams of nitrosyl chloride. Almost immediately the mixture became perceptively lighter in color indicating the removal of the dark colored components, nitrosyl chloride and chlorine monoxide, by the formation of nitrogen tetroxide which is colorless at this operating temperature. After about 10 hours, the liquid had the pale yellow color of chlorine. Pure chlorine was separated from the mixture by fractional distillation.

One method of practicing the invention involves the injection of a controlled amount of nitrosyl chloride into the gaseous chlorine leaving the electrolytic cells prior to liquefaction in a sulfuric acid compressor. During compression, the sulfuric acid will absorb the nitrogen tetroxide in accordance with the equation:

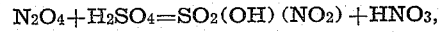
$$N_2O_4 + H_2SO_4 = SO_2(OH)(NO_2) + HNO_3,$$

a practically pure chlorine will leave the compressor. The process may also be carried out by the initial addition of nitrosyl chloride to the chlorine storage containers before admitting the liquid chlorine. Chlorine so produced may be marketed containing a small fraction of a per cent of nitrogen tetroxide. Chlorine containing nitrosyl chloride, produced by the treatment of metal chlorides with nitrogen oxides or nitric acid, may be purified by the addition of a controlled amount of chlorine monoxide to the liquid or gaseous chlorine leaving the rectification column in which the bulk of the nitrosyl chloride, formed by the action of the nitric acid on the salt, is separated from the chlorine. The gaseous chlorine may be subsequently liquefied by the use of a compressor lubricated with sulfuric acid or liquid chlorine may be treated with sulfuric acid, either of which will remove nitrogen tetroxide present.

As various changes may be made in the specific processes described without departing from the spirit of the invention, I do not wish to limit the scope thereof except as defined in the appended claims.

I claim:

1. The process which comprises reacting nitrosyl chloride with an oxide of chlorine to form an oxide of nitrogen and free chlorine.

2. The process which comprises reacting nitrosyl chloride with chlorine monoxide to form an oxide of nitrogen and free chlorine.

3. The process of purifying chlorine containing nitrosyl chloride which comprises adding an oxide of chlorine to the chlorine whereby the nitrosyl chloride and the oxide of chlorine react, and removing from the chlorine, an oxide of nitrogen produced by the reaction.

4. The process of purifying chlorine of nitrosyl chloride, which comprises adding an oxide of chlorine thereto, thereby decomposing the nitrosyl chloride.

5. The process of purifying chlorine containing chlorine monoxide which comprises adding nitrosyl chloride to the chlorine whereby the chlorine monoxide and the nitrosyl chloride react, and removing from the chlorine, an oxide of nitrogen produced by the reaction.

6. The process of purifying chlorine of an oxide of chlorine, which comprises adding nitrosyl chloride thereto, thereby decomposing the oxide of chlorine.

7. The process of purifying chlorine which comprises adding chlorine containing nitrosyl chloride to chlorine containing chlorine monoxide, whereby the nitrosyl chloride and the chlorine monoxide react.

8. The process of purifying electrolytic chlorine of chlorine compounds contained therein which comprises adding nitrosyl chloride thereto.

9. The process of purifying electrolytic chlorine, which comprises adding nitrosyl chloride thereto in amount at least sufficient to react with oxides of chlorine contained therein.

10. The process which comprises reacting nitrosyl chloride with an oxide of chlorine in an atmosphere of gaseous chlorine to form an oxide of nitrogen and free chlorine.

11. The process which comprises reacting nitrosyl chloride with an oxide of chlorine in liquid chlorine to form an oxide of nitrogen and free chlorine.

EUGENE D. CRITTENDEN.